United States Patent
Madsack et al.

[19]

[11] Patent Number: 5,976,051
[45] Date of Patent: Nov. 2, 1999

[54] DIFFERENTIAL DRIVE WITH INNER SUPPORTING MEANS FOR THE DIFFERENTIAL GEARS

[75] Inventors: Heinz Madsack, Overath; Adrian Chludek, St. Augustin, both of Germany

[73] Assignee: GKN Viscodrive GmbH, Lohmar, Germany

[21] Appl. No.: 08/792,439

[22] Filed: Jan. 30, 1997

[30] Foreign Application Priority Data

Jan. 30, 1996 [DE] Germany ............................ 196 03 264

[51] Int. Cl.$^6$ ................................................. F16H 48/10
[52] U.S. Cl. .............................................. 475/252; 475/249
[58] Field of Search .................................. 475/248, 249, 475/252

[56] References Cited

U.S. PATENT DOCUMENTS

| | | | |
|---|---|---|---|
| 1,690,189 | 11/1928 | Dennison | 475/250 |
| 1,859,245 | 5/1932 | Remington | 475/249 |
| 1,938,649 | 12/1933 | Welsh | 475/249 |
| 3,060,765 | 10/1962 | Rinsoz | 475/248 |
| 5,122,101 | 6/1992 | Tseng | 475/252 |
| 5,169,370 | 12/1992 | Dye et al. | 475/227 |
| 5,346,443 | 9/1994 | Crysler et al. | 475/248 |
| 5,441,461 | 8/1995 | Teraoka | 475/252 |
| 5,658,214 | 8/1997 | Hofstetter et al. | 475/249 |
| 5,785,624 | 7/1998 | Mayr | 475/248 X |

FOREIGN PATENT DOCUMENTS

| | | |
|---|---|---|
| 4017800 | 6/1990 | Germany . |
| 19548568 | 4/1997 | Germany . |
| 7243507 | 9/1995 | Japan . |
| 949561 | 2/1999 | Japan . |
| 6376938 | 4/1999 | Japan . |
| 2194995 | 6/1987 | United Kingdom . |
| 622351 | 6/1995 | United Kingdom . |

*Primary Examiner*—Sherry L. Estremsky
*Attorney, Agent, or Firm*—Howard & Howard

[57] ABSTRACT

A differential drive having a drivable differential carrier rotatably supported in a drive housing, said differential carrier comprising a carrier portion and two cover parts. Two axle shaft gears are coaxially rotatably supported in the differential carrier. Further, two sets of differential gears are slidingly received on their tooth heads, in axis-parallel cylindrical bores in the carrier portion. The axis-parallel cylindrical bores are in the form of through-bores in the carrier portion. The differential gears comprise spacing journals with ends having friction bearing portions. Corresponding friction bearing sections are formed in the differential carrier, axially adjoining the carrier portion.

8 Claims, 2 Drawing Sheets

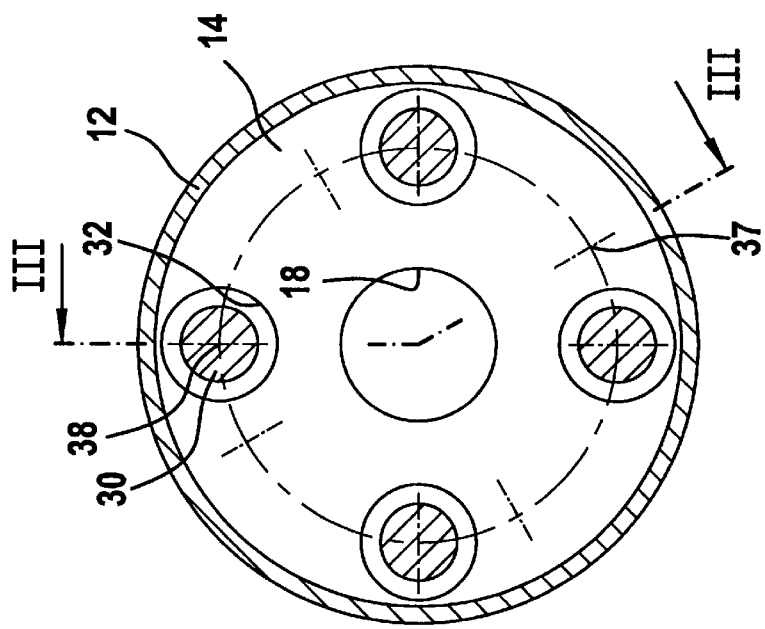
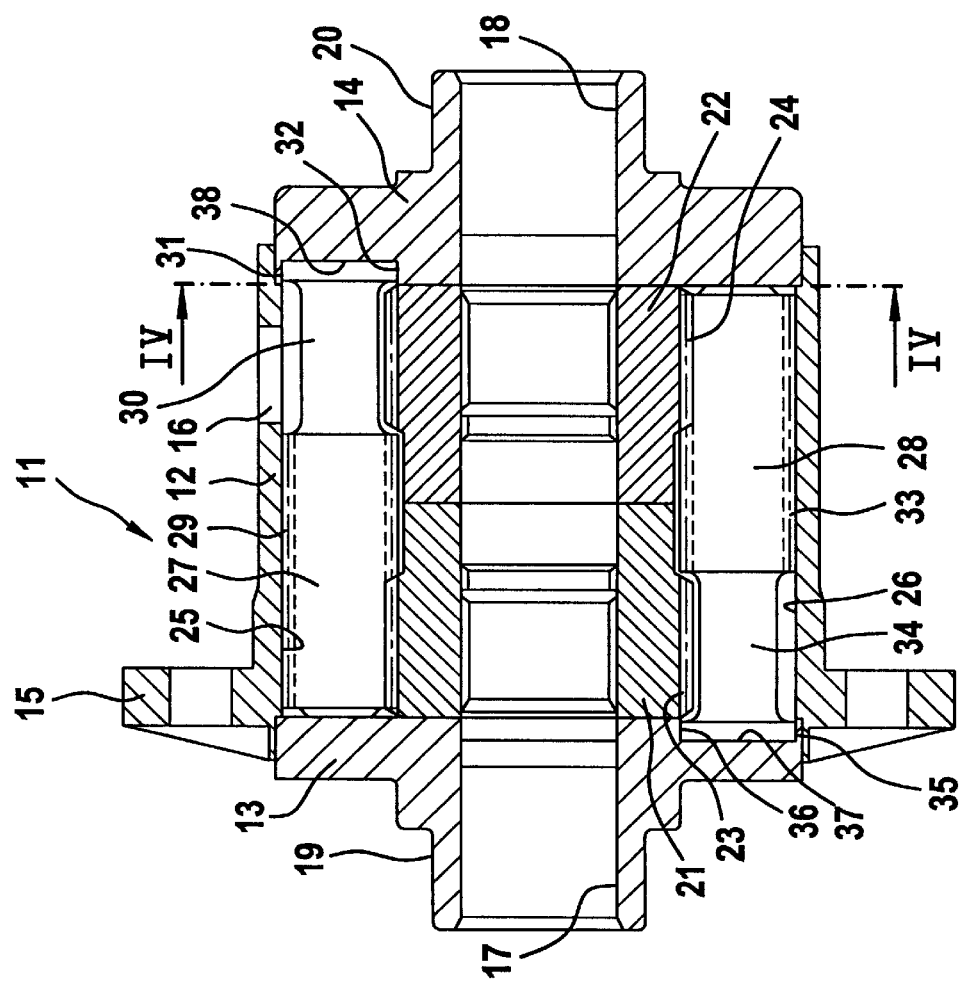

DIFFERENTIAL DRIVE WITH INNER SUPPORTING MEANS FOR THE DIFFERENTIAL GEARS

BACKGROUND OF THE INVENTION

This invention relates to a differential drive having a drivable differential carrier rotatably supported in a drive housing and comprising a carrier portion and two cover parts closing the ends of said carrier portion. Two axle shaft gears are coaxially rotatably supported in the differential carrier. The shaft gears are received in coaxial cylindrical bores in the carrier portion and are each connectable to an axle shaft. The differential carrier receives two sets of differential gears. Each set of differential gears has at least one differential gear, having tooth heads slidingly received in cylindrical bores in the carrier portion centered on axes parallel to the axis of the carrier portion. The teeth of each of the differential gears of the two sets engage the teeth of at least one differential gear of the other set. The cylindrical bores for the differential gears are in the form of through-bores in the carrier portion. The differential gears have toothed portions followed by spacing journals. The differential gears, by means of their ends, are at least indirectly axially supported in the differential carrier.

Differential drives of the above type are known from DE 40 13 200 A1, for example. For the purpose of simplifying the production of the differential carrier, the carrier portion is provided with through-bores with a constant diameter produced simply by broaching. To axially fix the differential gears in the through-bores, it has been proposed that the differential gears be extended beyond their toothed portions, by spacing journals. The differential gears approximately correspond to the length of the carrier portion. At the ends of the through-bores, the differential gears are supported on stop or closing means usually formed by covers which close the differential carrier at its axial ends. However, it is also possible to use simply designed stop discs or securing rings inserted directly into the through-bores.

DE 40 17 800 A1 describes differential drives of a similar type wherein the differential gears only cover part of the length of the carrier portion. The partial length corresponds to the length of the toothed portions of one of the axle shaft gears plus the length of a central toothed region to permit mutual engagement of the teeth of the differential gears of the two sets. In this embodiment, the differential gears are received in blind holes provided in the differential carrier so as to start alternately across the circumference from both axial ends of the carrier portion. The blind holes are closed directly by stop discs clamped in between the covers and the carrier portion.

A characteristic feature of the differential drives of the above type is that the differential gears are supported directly in the through-bores on their tooth heads. Due to the reaction forces between the axle shaft gears and the differential gears and between the differential gears of the different sets relative to one another, the supporting means generate a high degree of friction at the tooth heads. Thus a torque-dependent self-locking effect is generated. As engagement between the teeth of the differential gears of the two sets takes place along only part of their axial length between the respective toothed portions engaged with the two axle shaft gears, the load conditions along the length of the differential gears vary. Also, because the coaxial cylindrical bores for the axle shaft gears and the axis-parallel cylindrical bores for the differential gears are penetrating each other radially, the latter are inadequately supported in the differential carrier, against inwardly directed reaction forces.

SUMMARY OF THE INVENTION AND ADVANTAGES

It is the object of the present invention—with reference to a differential drive of the initially mentioned type—to improve the contact and load conditions of the differential gears in their through-bores. The objective is achieved by providing ends of the spacing journals of both sets of differential gears with radial friction bearing portions. The differential carrier, has corresponding radial friction bearing sections axially adjoining the carrier portion. The friction bearing sections rotatably accommodate the friction bearing portions at the spacing journals in a substantially radially play-free way. In this way, it is possible to prevent the differential gears from becoming inclined relative to the longitudinal axis and from applying greater pressure against the edge regions along the penetrations of the axis-parallel through-bores. This is achieved because the differential gears are each guided and supported in an additional bearing section. The friction bearing sections may be conical in shape and/or the spacing journals are designed to comprise a bending resilience. This ensures that parallel contact of the tooth heads in the axis-parallel through-bores is maintained under all load conditions.

According to a first advantageous embodiment, the friction bearing sections are provided directly in through-holes in disc elements inserted directly between the carrier portion and the cover parts. In connection with this measure the toothed regions of the axle shaft gears are to be axially shortened by the thickness of the disc elements, i.e. the axle shaft gears stop directly against the disc elements. As a result, simple cover parts may be used having a planar interior. The disc elements can be simple, flat plate metal discs of adequate thickness. Through-holes may be punched into the discs and constitute friction bearing sections and a central passage for the axle shafts.

According to another advantageous embodiment, the friction bearing sections are formed by countersunk regions or through-bores in the cover parts of the differential carrier. Such bearing sections permit the teeth of the axle shaft gears to extend as far as the cover parts which, at the same time, form the stop means for the toothed portions of the differential gears. The cylindrical countersunk regions or through-bores for the friction bearing sections can be produced mechanically. If the covers are produced from a sintered material, the countersunk regions or through-bores can be formed indirectly.

For standard axle shaft gears of identical size, the diameter of the spacing journals has to be drawn in between the toothed portions and the friction bearing portions.

To save weight, in a first embodiment, the diameter of the spacing journals including the friction bearing portions, throughout, is smaller than the base diameter of the toothed portion of the differential gears.

To reduce the load on the bearings, according to a further preferred embodiment, the diameter of the friction bearing portions approximately corresponds to the major diameter of the toothed portions of the differential gears.

BRIEF DESCRIPTION OF THE DRAWINGS

Below, a preferred embodiment will be described with reference to the drawing wherein:

FIG. 3 is a longitudinal section taken along line 3—3 of FIG. 4 of a second embodiment of a differential carrier of an inventive differential drive with an axle shaft and differential gears; and FIG. 4 is a cross-section taken along line 4—4 of a differential carrier of an inventive differential drive according to FIG. 3.

DETAILED DESCRIPTION OF THE PREFERRED EMBODIMENT

Figure 1:
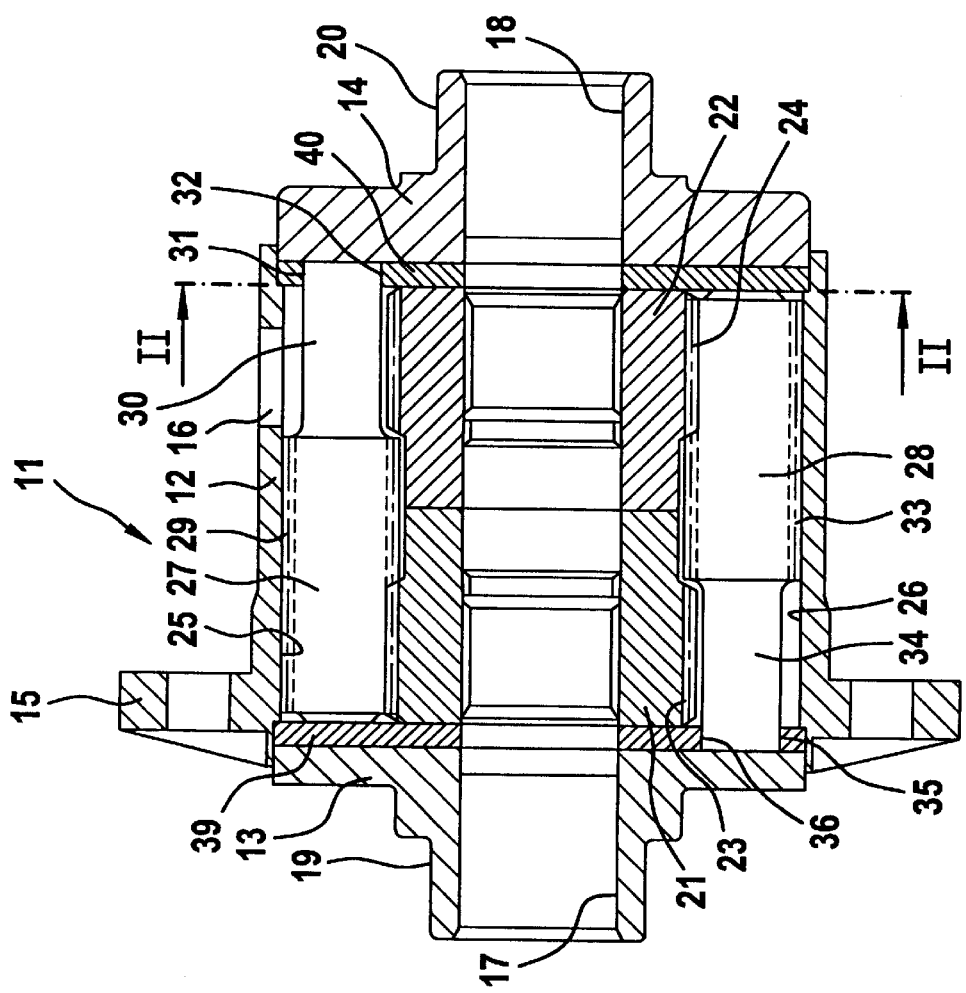
FIG. 1 is a longitudinal section taken along line 1—1 of FIG. 2 of a first embodiment of a differential carrier of an inventive differential drive with an axle shaft and differential gears.

FIG. 1 shows a differential carrier, generally shown at 11, consisting of a carrier portion or central portion 12 with a substantially axially constant cross-section and of two cover parts 13, 14 axially closing same. Disc elements 39, 40 are clamped in between the carrier portion 12 and the cover parts 13, 14. The carrier portion 12 is provided with an end flange 15 for fixing a crown wheel (not illustrated). The crown wheel is for rotatably driving the differential carrier 11 via a pinion supported in a drive housing (not illustrated). The differential carrier 11 has a wall aperture 16 for improving the access of lubricant to the interior. The cover parts 13, 14 and disc elements 39, 40 each comprise coaxial through-apertures 17, 18 for receiving axle shafts (not illustrated). Sleeve attachments 19, 20 are arranged concentrically relative thereto at the cover parts 13, 14 and are used to slip on a bearing means. The bearing means rotatably supports the differential carrier 11 in the drive housing (not illustrated). The axle shaft gears 21, 22 contact one another directly axially centrally and are supported on their ends by disc elements 39, 40. Axle shaft gears 21, 22 are held coaxially in the carrier portion 12. The toothed regions 23, 24 of the axle shaft gears 21, 22 cover only partial regions of the lengths of the axle shaft gears 21, 22. The axle shaft gears 21, 22 extend to the disc elements 39, 40. The axle shaft gears 21, 22 are held in a coaxial through-bore which is not visible in this section because it forms penetration regions with axis-parallel through-bores 25, 26 which accommodate differential gears 27, 28. One of four differential gears 27 of a first set of differential gears is held as visible at the top in the longitudinal section in one of the through-bores 25. One of four differential gears 28 of a second set of differential gears is held as visible at the bottom in the longitudinal section in one of the through-bores 26. The differential gear 27 comprises a toothed portion 29 and a spacing journal 30 having an end. The end of journal 30 forms a friction bearing portion 31 guided in a bearing section 32 in the form of a punched-out hole 42 in the second disc element 40. The differential gear 27, slidingly runs in the through-bore 25 by means of the tooth heads of the toothed portion 29. At the end of the toothed portion 29, the differential gear 27 is directly supported by a planar inner face of the disc element 39. The differential gear 28 comprises a toothed portion 33 and a spacing journal 34 having an end. The end of journal 34 forms a friction bearing portion 35, and is guided in a bearing section 36 in the form of a punched-out hole 41 in the first disc element 39. The differential gear 28 slidingly runs in the through-bore 25 by means of the tooth heads of the toothed portion 33. At the end of the toothed portion 33, the differential gear 28 is directly supported by the planar inner face of the disc element 40.

Figure 2:
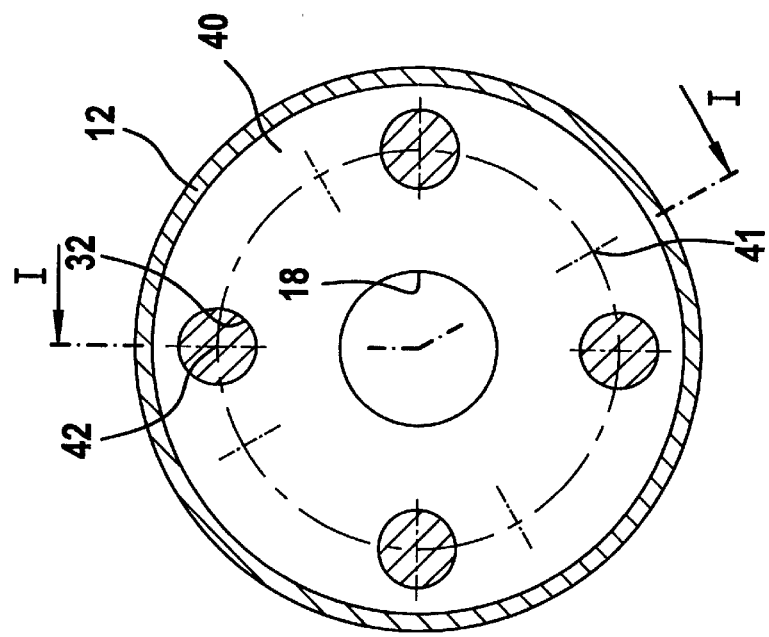
FIG. 2 is a cross-section taken along line 2—2 of FIG. 1 of the differential carrier of the inventive differential drive according to FIG. 1.

FIG. 2 shows the carrier portion 12 with the inserted disc element 40. The plate metal disc element 40 comprises the through-aperture 18 and four punched-out holes 42 for forming the bearing sections 32 for the bearing journals 31 of the first differential gears 27.

FIG. 3 shows a second embodiment differential carrier, generally indicated at 11, consisting of a carrier portion or central portion 12 with a substantially axially constant cross-section and two cover parts 13, 14 axially closing the same. The carrier portion 12 is provided with an end flange 15 for fixing a crown wheel (not illustrated) for rotatingly driving differential carrier 11 via a pinion supported in the drive housing (not illustrated). The differential carrier 11 has a wall aperture 16 for improving the access of lubricant to the interior. The cover parts 13, 14 each comprise coaxial through-apertures 17, 18 for receiving the axle shafts (not illustrated). Sleeve attachments 19, 20 are arranged concentrically relative to the through-apertures 17, 18 and are used for slipping on a bearing means. The purpose of the bearing means is to rotatably support the differential carrier 11 in the drive housing (not illustrated). The axle shaft gears 21, 22 contacting one another directly axially centrally and being supported on their ends by covers 13, 14 are held coaxially in the carrier portion 12. The toothed regions 23, 24 of the axle shaft gears 21, 22 cover only partial regions of the lengths of the axle shaft gears 21, 22. The axle shaft gears 21, 22 extend to the inside of covers 13, 14. The axle shafts gears 21, 22 are held in a coaxial through-bore, that is not visible in this section because it forms penetration regions with parallel axis through-bores 25, 26 which accommodate the differential gears 27, 28. One of four differential gears 27 of a first set of differential gears is held at the top in the longitudinal section in one of the through-bores 25. One of four differential gears 28 of a second set of differential gears is held at the bottom in the longitudinal section in one of the through-bores 26. The differential gear 27 comprises a toothed portion 29, a spacing journal 30 and a friction bearing portion 31 guided in a bearing section 32 formed by a countersunk portion 38 in the second cover 14. The differential gear 27, slidingly runs in the through-bore 25 by means of the tooth heads of the toothed portion 29. At the end of the toothed portion 29, the differential gear 27 is directly supported by a planar inner face of the cover 13. The differential gear 28 comprises a toothed portion 33, a spacing journal 34 and a friction bearing portion 35 guided in a bearing section 36 formed by a countersunk portion 37 in the first cover 13. The differential gear 28, slidingly runs in the through-bore 25 by means of the tooth heads of the toothed portion 33. At the end of the toothed portion 33, the differential gear 28 is directly supported by the planar inner face of the cover 14.

FIG. 4 shows the carrier portion 12 of the differential carrier 11 with the inserted cover 14. The cover 14 comprises the through-aperture 18 and four countersunk portions 38 for forming the bearing sections 32 for the bearing journals 31 of the first differential gears 27 which are all shown.

The invention has been disclosed through preferred embodiments. However, the following claims set forth the true scope and context of the invention.

We claim:

1. A differential drive having a driveable differential carrier rotatably supported and comprising:

a carrier portion and two cover parts closing ends of said carrier portion and two axle shaft gears coaxially rotatably supported, and received in coaxial cylindrical shaft gear bores in said carrier portion, said shaft gears each to be connected to an axle shaft;

two sets of differential gears each with at least one differential gear, said differential gears having teeth, slidingly received by means of tooth heads thereof in cylindrical differential gear bores in said carrier portion, said bores being axis-parallel with said carrier portion, said teeth of each of said differential gears of said two sets of differential gears engage said teeth of at least one differential gear of said other set, said cylindrical differential gear bores being formed as through-bores in said carrier portion and said differential gears having toothed portions followed by spacing journals, said differential gears each having ends, and said differential gear ends being at least indirectly axially supported in said differential carrier;

said spacing journals including end portions axially opposite to said toothed portions, said end portions of said spacing journals of said two sets including radial friction hearing portions and said differential carrier includes corresponding radial friction bearing sections supporting said radial friction bearing portions, said radial friction hearing sections axially adjoining said carrier portion and being formed by countersunk portions in said cover parts of said differential carrier.

2. A differential drive as recited in claim 1, wherein said cylindrical differential gear bores receive said toothed portions and a substantial portion of said spacing journals of each of said differential gears.

3. A differential drive according to claim 1, wherein said spacing journals include said friction bearing portions having a journal diameter and said toothed portions having a base diameter wherein said journal diameter is smaller than said base diameter.

4. A differential drive according to claim 1, wherein said toothed portions having a major diameter and said friction bearing portions having a bearing diameter wherein said bearing diameter approximately corresponds to said major diameter.

5. A differential drive comprising:
a differential carrier, having a carrier portion, and two cover parts closing ends of said carrier portion;

two axle shaft gears coaxially and rotatably supported in coaxial cylindrical shaft gear bores in said carrier portion, said axle shaft gears each being adapted to be connected to an axle shaft;

two sets of differential gears, each with at least one differential gear, said differential gears being slidingly received in cylindrical differential gear bores in said carrier portion, said differential gear bores being axis-parallel with said carrier portion, each of said differential gears of said two sets of differential gears engaging at least one differential rear of said other set, said differential gears having toothed portions and spacing journals, said differential gears each having ends, and said differential gear ends being at least indirectly axially supported in said differential carrier; and said spacing journals having end portions axially opposite to said toothed portions and including radial friction bearing portions, and said differential carrier including mating radial friction bearing sections supporting said radial friction bearing portions and being disposed axially adjacent said carrier portion, wherein said friction bearing sections are formed by countersunk portions in said cover parts.

6. A differential drive as recited in claim 5, wherein said cylindrical differential gear bores receive said toothed portions and a substantial portion of said spacing journals of each of said differential gears.

7. A differential drive according to claim 5, wherein said spacing journals include said friction bearing portions having a journal diameter and said toothed portions having a base diameter wherein said journal diameter is smaller than said base diameter.

8. A differential drive according to claim 5, wherein said toothed portions having a major diameter and said friction bearing portions having a bearing diameter wherein said bearing diameter approximately corresponds to said major diameter.

* * * * *